United States Patent
Logsdon et al.

(10) Patent No.: US 7,826,915 B1
(45) Date of Patent: Nov. 2, 2010

(54) SYSTEM AND METHOD FOR PROVIDING AUTOMATIC QUALIFICATION INTERVENTION IN A MANUFACTURING PROCESS

(75) Inventors: George Logsdon, Arlington, TX (US);
Gale Moericke, Mansfield, TX (US);
William MacDonald, Mansfield, TX (US); Edward J. Francis, Burleson, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 298 days.

(21) Appl. No.: 11/337,928

(22) Filed: Jan. 23, 2006

(51) Int. Cl.
*G06F 19/00* (2006.01)

(52) U.S. Cl. .................... 700/109; 702/84; 702/184

(58) Field of Classification Search ............... 700/121, 700/103, 108, 109, 111, 174, 175, 95; 702/81, 702/82, 84, 182, 183, 184
See application file for complete search history.

(56) References Cited

U.S. PATENT DOCUMENTS

| | | | |
|---|---|---|---|
| 4,351,029 A | 9/1982 | Maxey et al. | |
| 5,239,487 A * | 8/1993 | Horejsi et al. | 702/184 |
| 6,021,360 A | 2/2000 | Barker et al. | |
| 6,427,090 B1 | 7/2002 | Federico et al. | |
| 6,429,783 B1 | 8/2002 | Reyes et al. | |
| 6,708,072 B2 * | 3/2004 | Arima et al. | 700/108 |
| 6,950,716 B2 * | 9/2005 | Ward et al. | 700/121 |
| 2003/0029383 A1 * | 2/2003 | Ward et al. | 700/90 |

* cited by examiner

*Primary Examiner*—Charles R Kasenge

(57) ABSTRACT

A system and method is disclosed for providing automatic qualification intervention in a manufacturing process that is performed by a plurality of components. At least one qualification process is associated with each of the components. The qualification processes are stored in a component/qualification matrix in a computerized database management system. The automatic qualification intervention system requires that all qualification processes for a component must be performed in conformity with the qualification processes for the component that have been stored in the component/qualification matrix. The automatic qualification intervention system significantly reduces the delays that are inherent in prior art methods.

20 Claims, 10 Drawing Sheets

|  | Qual Define | | | Qual Verify | | | Qual Complete | | | Lost Tool Days | Avg. Occurrence (Hours) |
|---|---|---|---|---|---|---|---|---|---|---|---|
| Area | Avg. Time (Mins) | Count | Sub-Total (Days) | Avg. Time (Mins) | Count | Sub-Total (Days) | Avg. Time (Mins) | Count | Sub-Total (Days) | | |
| Diffusion | 74 | 291 | 14.9 | 33 | 250 | 5.8 | 23 | 334 | 5.4 | 26.1 | 2.2 |
| Implant | 29 | 230 | 4.7 | 29 | 152 | 0.2 | 12 | 206 | 1.8 | 6.7 | 1.2 |
| Etch | 14 | 669 | 6.7 | 8 | 448 | 2.6 | 16 | 561 | 6.3 | 15.6 | 0.6 |
| Photo | 36 | 1151 | 29.1 | 7 | 1027 | 5.5 | 25 | 1294 | 22.8 | 57.4 | 1.1 |
| Interconnect | 83 | 221 | 12.8 | 29 | 122 | 2.5 | 69 | 289 | 13.9 | 29.2 | 3.0 |
| PECVD | 86 | 361 | 21.6 | 23 | 292 | 4.6 | 41 | 440 | 12.6 | 38.8 | 2.5 |

FIG. 4
(PRIOR ART)

Workstation=POCL3; Subsystem=ALL; Component=ALL

900

| SUBSYSTEM | COMPONENT | ACTION ID | ENG REQUEST | PARTICLE TEST | PF1035 TEST RUN | PFxxxx TEST RUN | PROFILE | PROSOURCE | SPECIFY REASON FOR CHANGE *required | APPLY CHANGE |
|---|---|---|---|---|---|---|---|---|---|---|
| Boat Loader | Ball Nut | 7008 | ☐ | ☒ | ☒ | ☐ | ☐ | ☐ | | Update |
| Boat Loader | Belt | 7005 | ☐ | ☒ | ☒ | ☐ | ☐ | ☐ | | Update |
| Boat Loader | Boat-In Switch Set-up | 7002 | ☐ | ☒ | ☒ | ☐ | ☐ | ☐ | | Update |
| Boat Loader | Cam Followers | 7011 | ☐ | ☒ | ☒ | ☐ | ☐ | ☐ | | Update |
| Boat Loader | Gear | 7007 | ☐ | ☒ | ☒ | ☐ | ☐ | ☐ | | Update |
| Boat Loader | Head Assembly | 7013 | ☐ | ☒ | ☒ | ☐ | ☐ | ☐ | | Update |
| Boat Loader | Leadscrew | 7009 | ☐ | ☒ | ☒ | ☐ | ☐ | ☐ | | Update |
| Boat Loader | Motor | 7004 | ☐ | ☒ | ☒ | ☐ | ☐ | ☐ | | Update |
| Boat Loader | Paddle/Door/Tube Alignment | 7001 | ☐ | ☒ | ☒ | ☐ | ☐ | ☐ | | Update |
| Boat Loader | Potentiometer/Encoder | 7006 | ☐ | ☒ | ☒ | ☐ | ☐ | ☐ | | Update |
| Boat Loader | Skin Adjustment | 7014 | ☐ | ☒ | ☒ | ☐ | ☐ | ☐ | | Update |
| Boat Loader | Switches | 7010 | ☐ | ☒ | ☒ | ☐ | ☐ | ☐ | | Update |
| Boat Loader | Vacuuming (Paddle/Scavenger) | 7003 | ☐ | ☒ | ☒ | ☐ | ☐ | ☐ | | Update |
| Boat Loader | Wiring/Connections | 7012 | ☐ | ☒ | ☒ | ☐ | ☐ | ☐ | | Update |

QUAL LABELS

FIG. 9

| Workorder Activity | Equip Maint Info System (EMIS) | Online Help | LogOut AQUIP |

Wednesday, August 03, 2005 11:39:49 AM

1000

IFS Active Workorders Screen

*(Based on your criteria: DIFF - IMPLANT and TOOL DOWN workorders)*
Refresh Screen <--Go Back Workorders You're Currently Logged On

| LogOff? | WoNo | UserId | Log-On Time | Log-Off Time |
|---|---|---|---|---|

Overview Active Workorder

| Select? | WoNo | MchCode | Dept | Directive | Status | Start Date | Reported By | Comments | Logged On |
|---|---|---|---|---|---|---|---|---|---|
| O | 761647 | FICTITIOUS | DIFF | W PM | Started | 08/01/05: 18:00:00 | SYS | | N/A ○ LogON |
| O | 139395 | FURN F3 | DIFF | DOWN TO MNT | Started | 07/31/05: 00:55:46 | WORKSTREAM | REPORTED BY: CHWWTE Logging down to | N/A ○ LogON |

| ENTER WORK DONE | INPUT FREE NOTES | VIEW CURRENT WORK DONE |

FIG. 10

AQUIP - Data Management System Menu

You are logged in as: George W. Logsdon
READ-ONLY MODE
Role: RO
Area: ALL

Log Out

To link Qual Labels to Components: <u>Qual Lookup Martix Editor</u>
To add more Components to a Workstation: <u>Subsystem/Component Editor</u>
To quickly duplicate Subsystems and Components to other Workstations
To create Qual Labels and link them to Attributes: <u>Workstation Qual Label Editor</u>

<u>View Change Log</u>
<u>View Entities by Workstation</u>
Utilties
<u>Edit User Roles and Areas</u>
<u>Manage My Approvals</u> (upcoming feature)
<u>Qual Lookup Matrix with Change Control</u>
<u>Subsystem/Component Editor with Change Control</u>
if you have any questions please contact Andy Burks @ x6446

SYSTEM AND METHOD FOR PROVIDING AUTOMATIC QUALIFICATION INTERVENTION IN A MANUFACTURING PROCESS

TECHNICAL FIELD OF THE INVENTION

The present invention is generally directed to technology for manufacturing products and, in particular, to a system and method for providing automatic qualification intervention in a manufacturing process.

BACKGROUND OF THE INVENTION

In a manufacturing process (e.g., a manufacturing process for semiconductor wafers) there are often many steps to be performed in sequence. Typically one or more steps of the process is performed by a particular tool in a sequence of various tools that are utilized in the process. A first sequence of steps of the process is performed by a first tool in the tool sequence. Then a second sequence of steps is performed by a second tool in the tool sequence, and so on until the process is completed. For example, in a semiconductor wafer manufacturing process various tools may perform processes such as diffusion processes, implantation process, etching processes, photomasking processes and interconnection fabrication processes.

A tool operator must periodically perform one or more procedures on a tool to ensure that the tool is operating properly. When a tool experiences a problem and is then subsequently repaired (or even when a tool simply requires routine maintenance), the tool operator performs one or more procedures to "qualify" the tool for return to an operational status. The process of identifying, selecting and performing the "qualification" procedures for a tool is generally referred to as "qualification intervention."

To more clearly explain the concept of qualification intervention, a semiconductor manufacturing process will be described. It is understood that the principles involved may be generally applicable to many different particular types of manufacturing processes.

FIG. 1 illustrates a block diagram of prior art Manufacturing Execution System (MES) 110 and a prior art Industrial and Financial Systems (IFS) equipment maintenance management system 120 in a semiconductor wafer manufacturing process. MES 110 comprises an automated production process system that controls the manufacture of semiconductor wafers. One well-known system is the WORKSTREAM™ automated system sold by Applied Materials, Inc. of Mountain View, Calif.

Equipment maintenance management system 120 is generally referred to by the initials of its manufacturer Industrial and Financial Systems, Inc. ("IFS"). IFS system 120 comprises an enterprise resource planning application that performs such tasks as monitoring the performance of work orders, coordinating the purchase of parts and materials, scheduling preventative maintenance, and the like.

In the semiconductor wafer manufacturing industry any event that causes semiconductor wafers to be defective is to be avoided. Defective wafers must be thrown away as scrap. To avoid the loss of valuable product as scrap it is very important to minimize the number of incidents that create defective product.

Assume that a piece of manufacturing equipment goes off line and ceases to work. Then a maintenance technician works with the equipment and does something to it (or perhaps does not do anything to it). But the maintenance technician did something with the equipment (even if parts of the equipment were removed and inspected and then subsequently replaced). The equipment then comes back on line and starts making product again. But then the equipment causes the semiconductor wafer products to be defective ("scrap" product). When the cause is investigated it may be determined that the reason that the defective product was created was that (1) the person who worked with the equipment did something that should not have been done, or (2) the person who worked with the equipment did not do something that should have been done, or (3) some other reason caused the defective product to be created.

In the prior art the standard technique for preventing the creation of defective product that is due to someone having worked on a piece of equipment involves performing one or more equipment qualification procedures. When a piece of equipment comes back on line, the equipment operator is supposed to perform one or more procedures to "qualify" the equipment. That is, the equipment operator is supposed to perform one or more procedures to ensure that the equipment is properly operating.

The problem with the prior art method for performing the qualification procedures is that the prior art technique relies upon the operating personnel to properly do the things that they are supposed to do during the qualification procedures. In particular, the operating personnel are required to properly execute the instructions that they are supposed to execute, and to properly interpret the results that they are supposed to interpret. In addition, the prior art method relies upon the operating personnel make judgment calls concerning what should be done during the qualification procedures in the first place. As might be expected, judgment calls that are made by the operating personnel are quite subjective and lead to a wide variation in the type of qualification procedures that are actually performed in any given case.

An additional problem in the prior art method is that the communication between the various operating personnel is accomplished with non-standard types of communication. For example, the operating personnel may communicate through written work instructions, data commonly known to workers in a specific area of operations (referred to as "tribal knowledge"), and informal information interchange.

The operating personnel are human and often make mistakes. Therefore it would be advantageous to have a system and method that minimizes the human error that may occur when qualification procedures are selected and performed on equipment in a manufacturing process.

In order to better understand the nature of a prior art "qualification intervention" process, a prior art qualification intervention process will now be discussed in detail. FIG. 2 illustrates a chart 200 showing a sequence of events that may occur when a scheduled or non-scheduled trigger event occurs in a particular tool (not shown) during the manufacturing process. In the first event shown in FIG. 2 the tool experiences a trigger event (step 210). A scheduled trigger event may be a routine maintenance procedure that is regularly scheduled to be performed. A non-scheduled trigger event may be a malfunction of the tool, an alarm or error message that the tool initiates that indicates that some parameter is out of an allowable range, or an alarm or error message that some other irregular tool performance has been detected.

The tool operator then enters all available information concerning the trigger event into the Manufacturing Execution System (MES) 110. The tool operator enters the description of the trigger event into the MES 110 in the form of text that contains a narrative description what the tool operator observed and what the tool operator thinks the problem, if any, may be. The text message of the narrative description is referred to as a "free text" message. The tool operator sends the "free text" message to the maintenance department, takes the tool offline (i.e., out of production) and logs the tool as "down to maintenance" (step 215).

A maintenance technician receives the "free text" message from the MES 110 and tries to find out the exact nature of the problem, if any, that the tool has experienced. At this point the tool may or may not be exhibiting an original error message that caused the tool operator to create the original "free text" message that described the problem. It may even be that the status of the tool now seems satisfactory and that the "problem" that the tool had is no longer present.

When the tool operator sends a "free text" message to the MES 110 concerning the problem that was detected in the tool, the MES 110 generates a work order (WO) for the problem and sends the work order to the IFS system 120 (step 220). The maintenance technician reviews the work order and determines what steps need to be taken to get the tool running again and ready to go back into production. If the work order indicates that a regularly scheduled maintenance procedure is due, then the maintenance procedure is performed. If the work order indicates the existence of some non-scheduled event that represents a "problem" situation, then the nature of the problem must be determined and corrective steps identified.

The maintenance technician then performs work on the tool (step 225). The work will be either routine maintenance work or, if a problem exists, corrective work such as repair and replacement of parts. The maintenance technician then sends a "free text" message describing the work that has been done to the IFS system 120. The IFS system 120 sends the message to the MES 110. The message explains the nature of the work that the maintenance technician actually performed (step 230). The remarks of the maintenance technician may or may not contain a thorough description of the work that was performed. The "free text" format of the message means that the maintenance technician's narrative description of the remedial work that was performed on the tool may be very subjective. Important features of the work that was performed may be omitted from the remarks. Different maintenance technicians have different levels of writing ability and powers of description. Therefore a substantial variance may exist in the quality of the maintenance reports and their interpretation.

A process engineer then reviews the "free text" message from the maintenance technician. The process engineer then makes a subjective determination concerning which qualification procedures ("Quals") need to be performed on the tool before the tool can be placed back into production (step 235). This is referred to as the "Qual Define" process. The process engineer then sends a "free text" message to the tool operator that identifies which qualification procedures are to be performed.

Different individual engineers may or may not make the same recommendation for a given case. That is, the selection process for determining which qualification procedures are to be performed may exhibit significant variations. A first process engineer may require only one qualification procedure for a given case, while a second process engineer may require two qualification procedures for the same case. These variations may be due to the differences in knowledge and experience of the two engineers.

The tool operator then performs the qualification procedures on the tool that have been requested by the process engineer (step 240). The tool operator then sends a report to MES 110 verifying that the requested qualification procedures have been performed (step 245). This is referred to as the "Qual Verify" process.

Then the process engineer confirms that the tool operator did perform the requested qualification procedures on the tool (step 250). This is referred to as the "Qual Complete" process. After the "Qual Complete" process has been performed the tool is returned to production (step 255).

The prior art "qualification intervention" process described above is quite cumbersome. Many of the decisions that are required to be made by operating personnel during the process are quite subjective. There are many opportunities in the process for the operating personnel to make errors and create inconsistencies. Notes written by a first individual (e.g., tool operator) must be interpreted by a second individual (e.g., maintenance technician) and notes written by the second individual must be interpreted by a third individual (e.g., process engineer).

Furthermore, there may be long delays between the various steps of the prior art "qualification intervention" process. Consider the streamlined version of the "qualification intervention" process 300 shown in FIG. 3. The streamlined version of the process 300 begins with the action taken by the maintenance technician (step 310). The action may be preventive maintenance (PM) or repair maintenance (RM). This is followed by the "Qual Define" process (step 320), the performance of the qualification procedures (step 330), the "Qual Verify" process (step 340), and the "Qual Complete" process (step 350). Lastly, the tool is returned to production (step 360).

FIG. 4 illustrates a table 400 showing typical delays that are inherent in a "qualification intervention" process 300 of the type shown in FIG. 3. Table 400 was compiled from actual manufacturing runs for a single month in six areas of a semiconductor wafer manufacturing process. The six areas were Diffusion, Implant, Etch, Photo, Interconnect and PECVD (Plasma Enhanced Chemical Vapor Deposition).

For example, consider the Diffusion process. The average delay time for the Diffusion "Qual Define" process was seventy-four (74) minutes. The number of such events was two hundred ninety one (291). This means that the cumulative delay time was fourteen and nine tenths (14.9) days for the Diffusion "Qual Define" process.

The average delay time for the Diffusion "Qual Verify" process was thirty-three (33) minutes. The number of such events was two hundred fifty (250). This means that the cumulative delay time was five and eight tenths (5.8) days for the Diffusion "Qual Verify" process. The average delay time for the Diffusion "Qual Complete" process was twenty-three (23) minutes. The number of such events was three hundred thirty four (334). This means that the cumulative delay time was five and four tenths (5.4) days for the Diffusion "Qual Complete" process. The total number of Lost Tool Days for the Diffusion process was twenty-six and one tenth (26.1) days. Similar figures are shown for the other five areas of the semiconductor wafer manufacturing process.

In view of the above-described deficiencies of the prior art "qualification intervention" process, it would be advantageous to have a system and method for providing an automatic qualification intervention system in a manufacturing process. It would be advantageous to have a system and method that automatically performs the "qualification intervention" process in a manufacturing process.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 4 illustrates a table showing typical delays that are caused by a prior art qualification intervention process in a semiconductor wafer manufacturing process;

FIG. 9 illustrates an exemplary view of a first graphical user interface of the automatic qualification intervention process of the present invention;

FIG. 10 illustrates an exemplary view of a second graphical user interface of the automatic qualification intervention process of the present invention;

FIG. 11 illustrates an exemplary view of a third graphical user interface of the automatic qualification intervention process of the present invention;

DETAILED DESCRIPTION OF THE INVENTION

FIGS. 5 through 13, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged manufacturing process.

Figure 1:
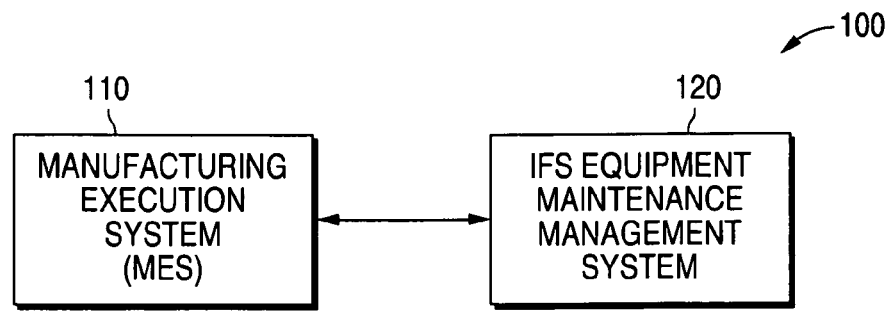
FIG. 1 illustrates a block diagram of prior art Manufacturing Execution System (MES) and a prior art IFS system in a semiconductor wafer manufacturing process.
Figure 3:
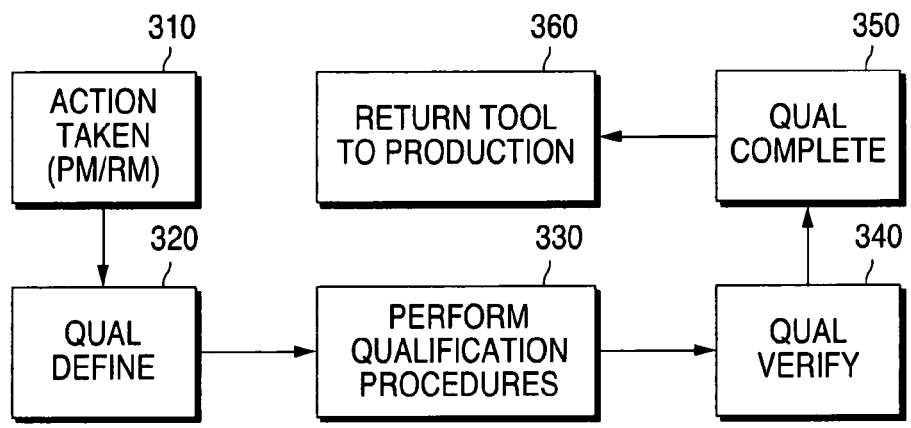
FIG. 3 illustrates a flow chart of a streamlined version of the prior art qualification intervention process shown in FIG. 2.
Figure 5:
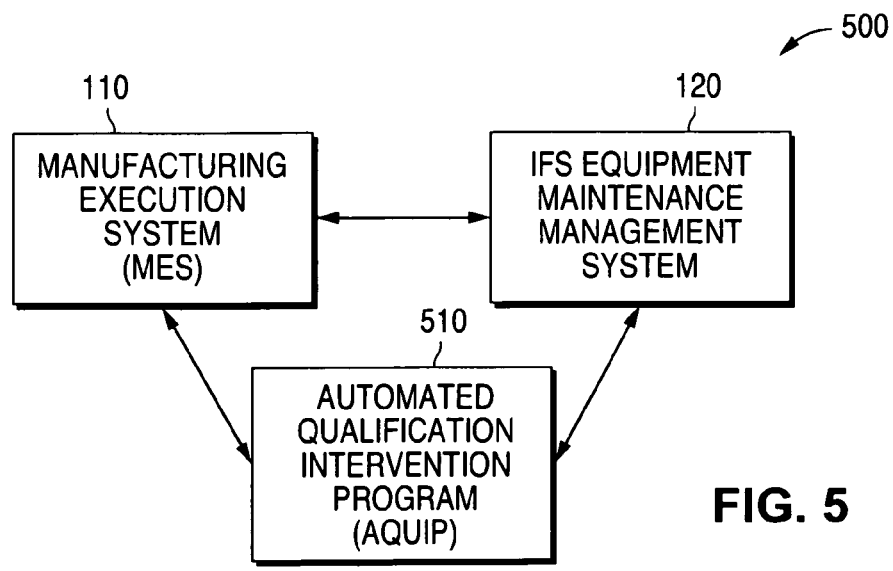
FIG. 5 illustrates a block diagram of an automatic qualification intervention process (AQUIP) of the present invention coupled to a Manufacturing Execution System (MES) and to an IFS system in a semiconductor wafer manufacturing process.
Figure 2:
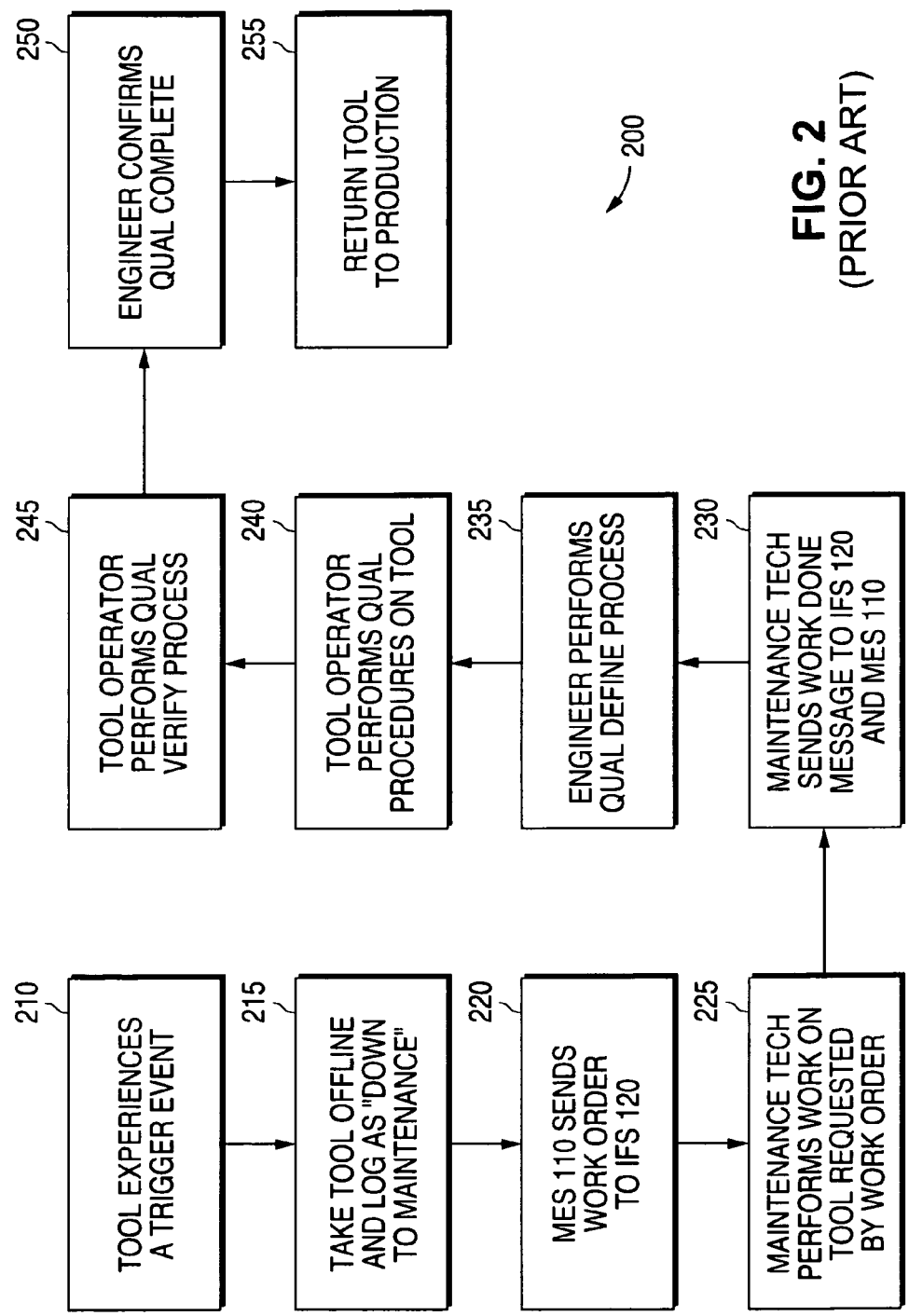
FIG. 2 illustrates a flow chart of an exemplary prior art qualification intervention process in a semiconductor wafer manufacturing process.

FIG. 5 illustrates a block diagram 500 showing an automatic qualification intervention process (AQUIP) 510 of the present invention for a semiconductor wafer processing system. AQUIP 510 is coupled to Manufacturing Execution System (MES) 110 and to IFS system 120. As previously mentioned, while the present invention will be described with reference to a semiconductor wafer manufacturing process, the present invention is applicable to many different particular types of manufacturing processes.

The automatic qualification intervention process (AQUIP) 510 is designed to take away from the operating personnel (as much as possible) the decision making process that determines which qualification procedures should be selected in a particular instance. The automatic qualification intervention process (AQUIP) 510 is also designed to automate the decision making process by taking appropriate knowledge from engineers and building the knowledge into a system that can automatically make the proper decisions based upon all of the relevant factors and input parameters.

The automatic qualification intervention process (AQUIP) 510 is also designed to execute the proper decisions in real time when a piece of equipment needs to have one of more qualification procedures performed. The automatic qualification intervention process (AQUIP) 510 is also designed to ensure that each of the tasks of a qualification procedure has been properly performed by appropriate manufacturing personnel.

Figure 6:
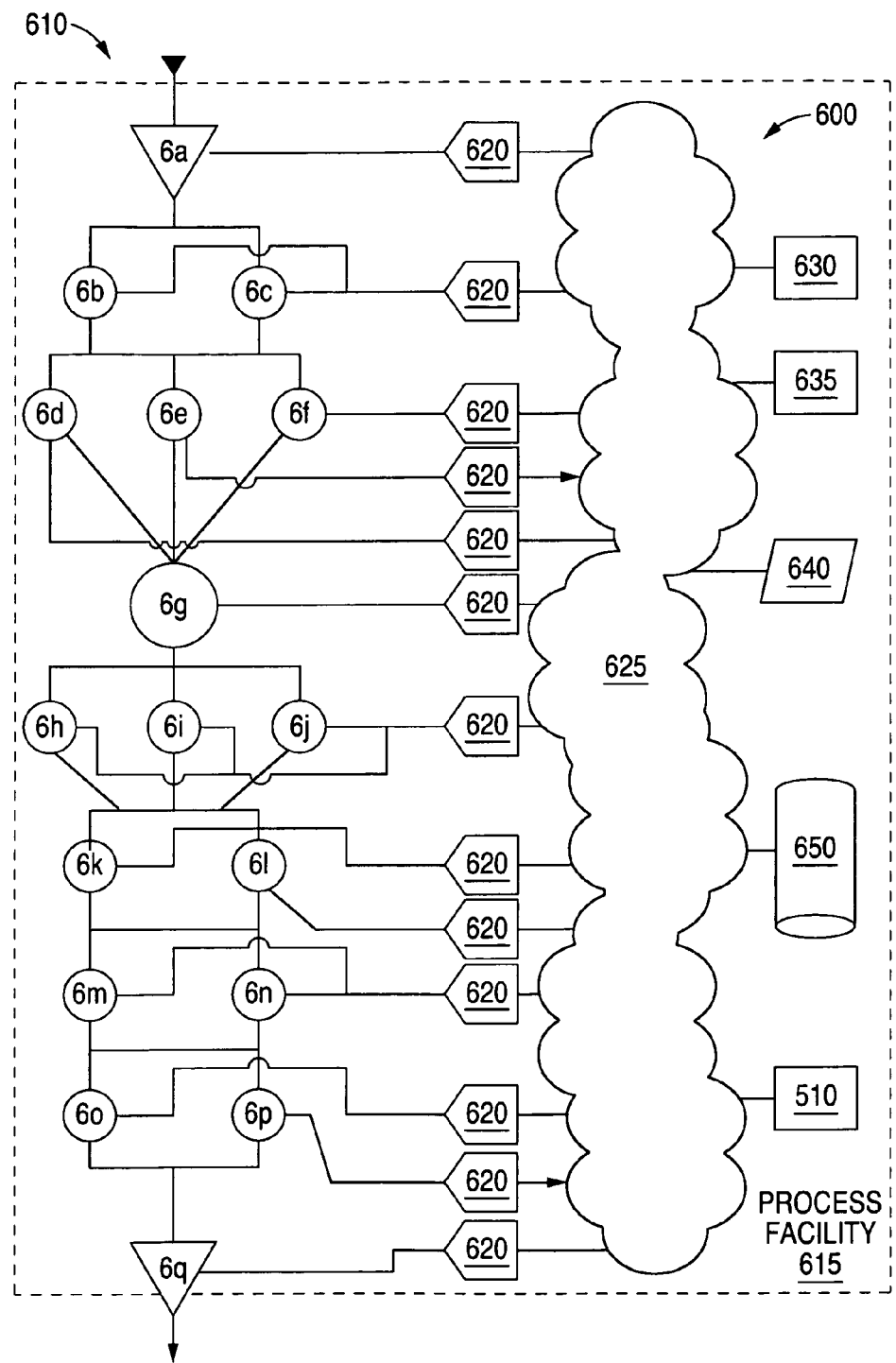
FIG. 6 illustrates a block diagram of an exemplary manufacturing system that employs an automatic qualification intervention process in accordance with the principles of the present invention.

FIG. 6 illustrate a block diagram of an exemplary process system 600 that operates to control a production process 610 within a process facility 615 in accordance with the principles of the present invention. In one advantageous embodiment, the production process 610 is a process for manufacturing semiconductor wafers.

Exemplary production process 610 is carried out using a plurality of durable items (6a to 6q). The term "durable item" refers to and means any process tool or other resource that is used during a physical process (e.g., a furnace used to heat items). In the configuration shown in FIG. 6, the first step of the process is performed by durable item 6a, then the second step of the process is performed by durable item 6b or durable item 6c. The third step of the process is performed by durable items 6d, 6e, 6f, and so on. The last step of the process is performed by durable item 6q.

The durable items (6a to 6q) that are used in the production process 610 are subject to normal wear and tear. The durable items (6a to 6q) are also subject to malfunction, breakage and damage during use.

Exemplary process system 600 is implemented using a processing system network 625. Processing system network 625 is coupled to and provides communication between the various modules of the processing system 600. Processing system network 625 is coupled to each of the plurality of durable items (6a to 6q) through a durable item processing system 620. Each durable item processing system 620 is associated with and controls at least one durable item 6.

The control exercised by a durable item processing system 620 over its respective durable items 6 may be as simple as monitoring readings that are associated with the durable item 6, such as temperature, pressure, or the like. The control may also be more complex such as operating one or more durable items 6 to perform one or more functions. In one advantageous embodiment, one or more durable items 6 are capable of performing multiple functions, such as providing different processing stages or types of processing stages within the production process 610, which is capable of producing different products or product lines.

Exemplary process system 600 also comprises an automated production process system 630 that operates to control the production process 610. In one advantageous embodiment in which the production process 610 comprises the manufacture of semiconductor wafers, the automated production process system 630 comprises the Manufacturing Execution System (MES) 110 for controlling the manufacture of semiconductor wafers (e.g., the WORKSTREAM™ automated system sold by Applied Materials, Inc. of Mountain View, Calif.).

The exemplary process system 600 may also comprise a secondary automated production process system 635. In the advantageous embodiment in which the production process 610 comprises the manufacture of semiconductor wafers, the secondary automated production process system module 635 may comprise an IFS system 120.

Exemplary process system 600 also comprises at least one input/output unit 640 and at least one memory unit 650. The input/output unit 640 operates to allow operators or other authorized personnel to interact with the process system 600. In FIG. 6, although the input/output unit 640 is illustratively shown as a single device, it is understood that there may be more than one input/output unit 640 that is associated with the process system 600.

The memory unit 650 operates to store all information that is associated with the process system 600. It is understood that memory unit 650 may comprise any suitable memory technology. It is also understood that the memory unit 650 may be in the form of a single storage device or multiple storage devices, and may be spread across the processing system network 625.

As shown in FIG. 6, exemplary process system 600 also comprises the automatic qualification intervention process (AQUIP) 510 of the present invention. The structure and operation of AQUIP 510 will be described more fully below.

Figure 7:
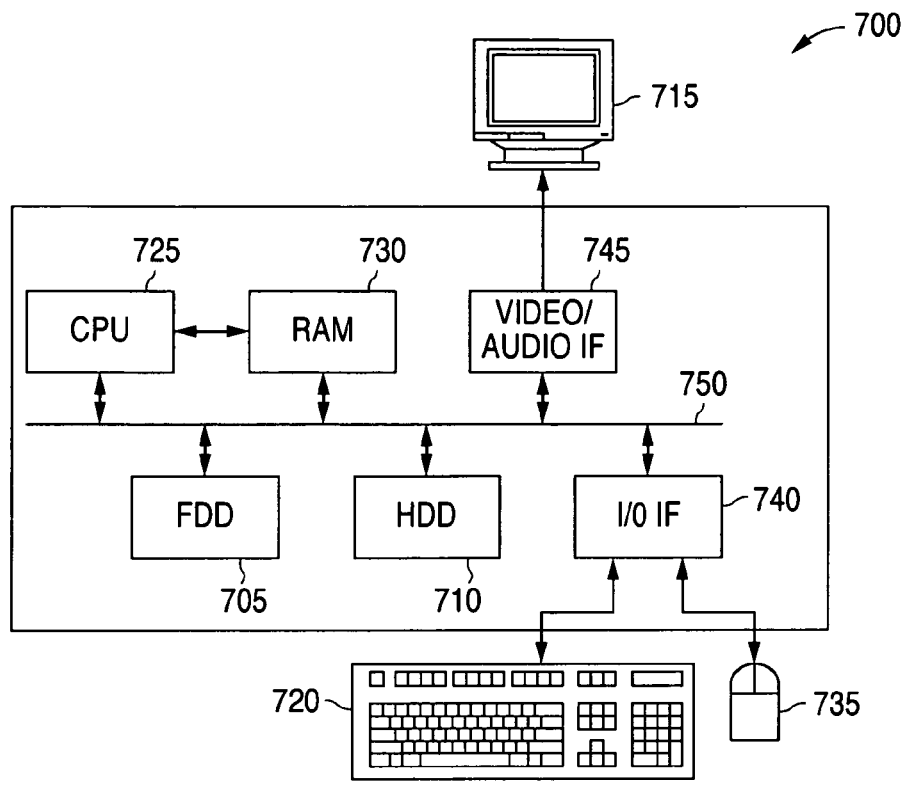
FIG. 7 illustrates a diagram of a processing system that is capable of executing instructions to perform the automatic qualification intervention process of the present invention.

FIG. 7 illustrates a diagram of an exemplary processing system 700 that is capable of being operated in accordance with the principles of the present invention. Processing system 700 is operable to carry out instructions to perform any of the functions of the durable item processing system 620, the automated production process system 630 (e.g., MES system 110), the secondary automated production process system 635 (e.g., IFS system 120), and the automatic qualification intervention process (AQUIP) 510. For purposes of illustration, concurrent reference is made to the embodiment shown in FIG. 6.

Processing system 700 illustratively comprises a removable disk drive 705 (designated FDD for "floppy disk drive"), a hard disk drive 710 (designated HDD for "hard disk drive"), a monitor 715, a keyboard 720, a central processing unit ("CPU") 725, a main memory unit 730 (designated RAM for "random access memory"), a pointing device 735 (such as a computer mouse), an input/output ("I/O") interface 740, and a video/audio interface 745. Monitor 715, keyboard 720, and pointing device 735 may be replaced by, or combined with, any other suitable I/O device.

Exemplary removable disk drive 705 may suitably be capable of reading and writing to removable diskettes. Exemplary hard disk drive 730 may suitably be capable of fast access for storage and retrieval of application programs and data. The internal components of processing system 700, including removable disk drive 705, hard disk drive 710, central processor unit 725, main memory unit 730, I/O interface 740 and video/audio interface 745, are coupled to and communicate across a communications bus 750.

Figure 8:
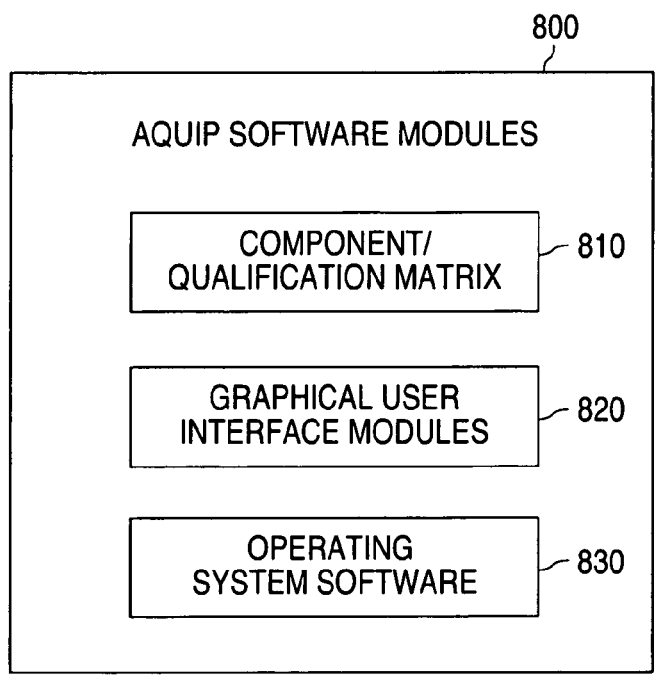
FIG. 8 illustrates a diagram that shows software modules of the automatic qualification intervention process of the present invention.

FIG. 8 illustrates a diagram that shows software modules 800 for the AQUIP system 510. The first software module is a component/qualification matrix 810 of the AQUIP system 510. The component/qualification matrix 810 comprises a computerized database containing data in which each component of the process system 600 is associated with at least one qualification procedure that has been determined to be required for properly qualifying the component.

The second software module comprises graphical user interface modules 820 that enable a user to provide information to and receive information from the AQUIP system 510. The third software module comprises operating system software for operating the AQUIP system 510.

Processing system 700 and the computer software modules 800 together comprise the automatic qualification intervention system 510 that is capable of carrying out the functions of the present invention. Under the direction of instructions in the computer software modules 800 stored within memory 650 or within memory 730, central processing unit 725 manages the operation of the component/qualification matrix 810 and controls the operation of the automatic qualification intervention process in the process system 600.

The qualification procedures that are required for a particular component in a particular instance (either a normally scheduled maintenance event or an unexpected error condition) have been identified in advance and stored in the component/qualification matrix 810. Equipment engineers and process engineers have analyzed the various interactions of the various components of the process system 600 in order to determine which qualification procedures are necessary and which qualification procedures are not necessary in a particular instance. The results of the analysis that identify the necessary qualification procedures have been placed in the component/qualification matrix 810 of the AQUIP system 510 where they can be immediately accessed by a user whenever desired.

For example, when a tool operator needs to know what qualification procedures are to be performed for a tool, the tool operator simply accesses the MES system 110 and performs the qualification procedures that are indicated for that particular tool. The MES system 110 accesses the component/qualification matrix 810 of the AQUIP system 510 and immediately provides the tool operator with the relevant information. The delays that are inherent in the prior art method are avoided.

There is no longer any need to wait for an engineer to perform the "Qual Define" process as is done in the prior art method. The information that is stored in the component/qualification matrix 810 is readily accessible (in real time) for each component and each possible item of "work done" on each component. The delays that are inherent in the prior art "Qual Define" method are avoided.

In addition, there is no longer any need to wait for a tool operator to perform the "Qual Verify" process as is done in the prior art method. There is also no longer any need to wait for an engineer to perform the "Qual Complete" process as is done in the prior art method. After the tool operator has performed the qualification procedures on a tool, then the AQUIP system 510 automatically confirms when the required qualification procedures have been performed. The AQUIP system 510 will not allow the tool to be returned to production until all of the required qualification procedures have been performed. The delays that are inherent in the prior art "Qual Verify" method and in the prior art "Qual Complete" method are avoided.

FIG. 9 illustrates an exemplary view 900 provided by one of the graphical user interface modules 820 of the AQUIP system 510. The exemplary view 900 shows the entries of the component/qualification matrix 810 for several components of a "Boat Loader" subsystem. In this particular "Boat Loader" subsystem the qualification procedures for each of the components that are shown in FIG. 9 are qualification procedures entitled (1) Particle Test, and (2) PF1035 Test Run. The requirement that these qualification procedures be performed is indicated by the presence of checks in the appropriate boxes.

One of the possible qualification procedures shown in FIG. 9 is entitled "Eng Request." This stands for "Engineering Request." When the "Eng Request" is selected, an engineer is summoned to review the situation and determine a course of action to be taken. The "Eng Request" qualification procedure serves as a default qualification procedure if no other qualification procedure will solve the problem at hand. The "Eng Request" qualification procedure may be selected whenever a review by an engineer is desired.

The AQUIP system 510 allows a user to access all of the various entries of information that is stored in the component/qualification matrix 810. A user can enter the name of a component of a subsystem element and immediately determine which qualification procedures are required to be performed in order to qualify the component to be returned to an operational status. As previously described, the AQUIP system 510 will not allow the component to be returned to an operational status until the required qualification procedures have been performed.

FIG. 10 illustrates an exemplary view 1000 provided by another of the graphical user interface modules 820 of the AQUIP system 510. The exemplary view 1000 shows a work order screen. A user can submit a request for the AQUIP system 510 to display work order information. The user can request a particular work order to be displayed by specifying a work order number (WoNo) (e.g., 761647).

The user can also request work orders to be displayed that meet selected criteria. For example, the work orders displayed in exemplary view 1000 are displayed in response to a request to display TOOL DOWN type work orders for a Diffusion Implant process (designated DIFF-IMPLANT). Various items of information (e.g., Status, Start Date, Reported By, Comments) are provided for each work order. The user can find out the status of the current work done on a particular work order by selecting the display button entitled "View Current Work Done." The user can also add information to the work order database of the AQUIP system 510 by selecting the display buttons entitled "Enter Work Done" and "Input Free Notes." In this manner the status of the work order activity in the AQUIP system 510 is kept current.

FIG. 11 illustrates an exemplary view 1100 provided by another of the graphical user interface modules 820 of the AQUIP system 510. The exemplary view 1100 shows an AQUIP Data Management System Menu. A user can access the AQUIP system 510 to perform various functions. For example, the user can access a "Qual Lookup Matrix Editor" in order to link Qual Labels to Components. The user can also access a "Subsystem/Component Editor" in order to add more components to a workstation. The user can also access a "Workstation Qual Label Editor" in order to create Qual Labels and link them to attributes. The user can also quickly duplicate subsystems and components to other workstations.

The user can also enter changes to information stored in the Qual Lookup Matrix (provided that the user has authority or obtains authority to make such changes). The user can also access a "View Change Log" module to view a history of changes that have been made. The user can also access other modules such as "View Entities by Workstation" and "Edit User Roles and Areas."

The various modules that are accessible by the AQUIP Data Management System Menu 1100 are illustrative. That is, the number and type of modules that may be accessed from the AQUIP Data Management System Menu 1100 are not limited to the specific modules that are shown in FIG. 11. Is so desired, other modules may be added to access other types of information in the AQUIP system 510.

The three graphical user interfaces 820 described above (900, 1000, 1100) are illustrative. That is, the number and type of graphical user interfaces 820 that provide access to the AQUIP system 510 are not limited to the specific graphical user interfaces 820 that are shown in FIG. 9, and in FIG. 10 and in FIG. 11.

Figure 12:
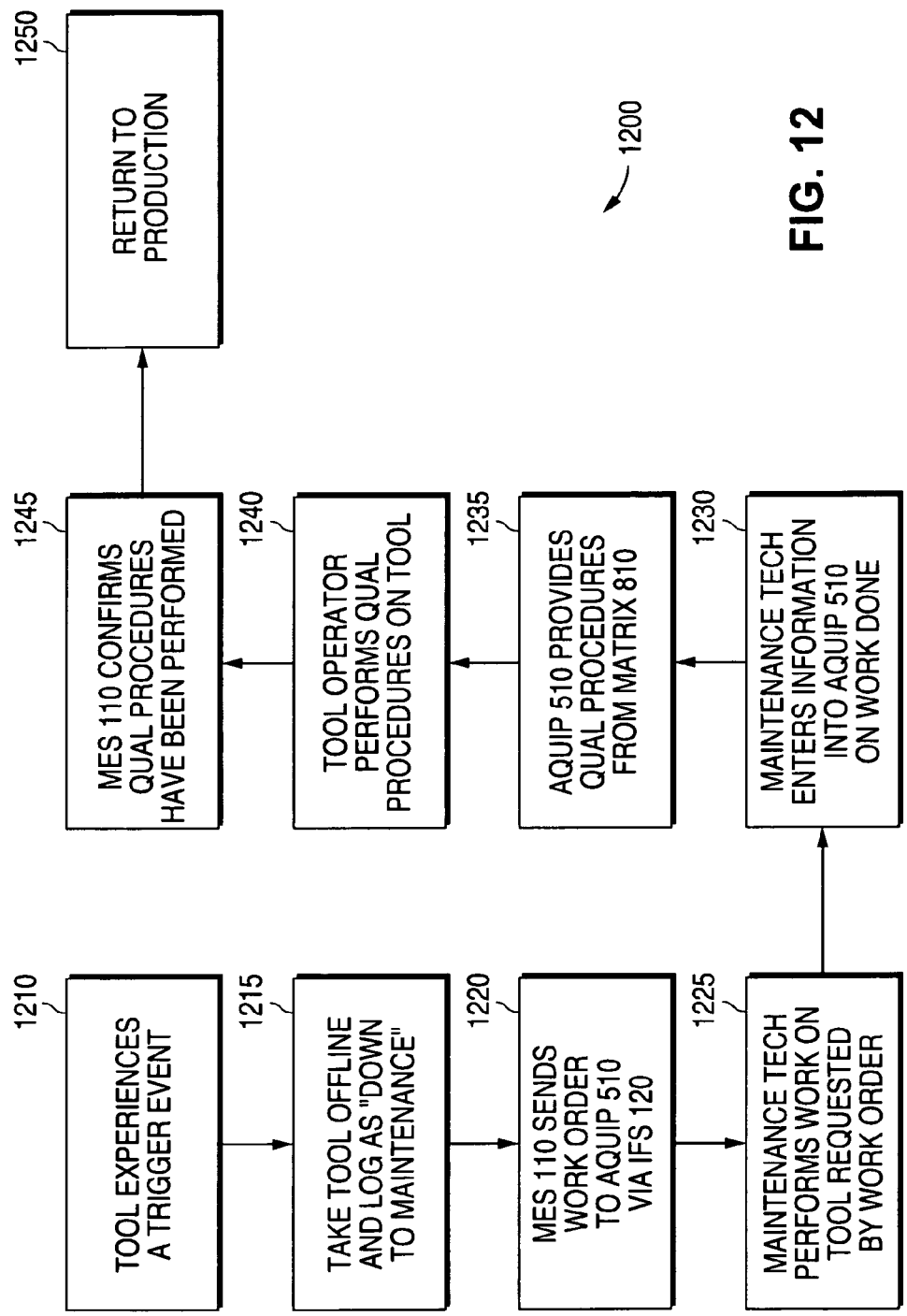
FIG. 12 illustrates a flow chart that shows a sequence of events that may occur in a tool within a manufacturing process that is controlled by the automatic qualification intervention process of the present invention.

FIG. 12 illustrates a flow chart 1200 showing a sequence of events that may occur when a scheduled or non-scheduled trigger event occurs in a particular tool (not shown) during a manufacturing process that is controlled by the AQUIP system 510. In the first event shown in FIG. 12 the tool experiences a trigger event (step 1210). A scheduled trigger event may be a routine maintenance procedure that is regularly scheduled to be performed. A non-scheduled trigger event may be a malfunction of the tool, an alarm or error message that the tool initiates that indicates that some parameter is out of an allowable range, or an alarm or error message that some other irregular tool performance has been detected.

The tool operator then enters all available information concerning the trigger event into the Manufacturing Execution System (MES) 110. The tool operator enters the description of the trigger event into the MES 110 in the form of text that contains a narrative description what the tool operator observed and what the tool operator thinks the problem, if any, may be. The text message of the narrative description is referred to as a "free text" message. The tool operator sends the "free text" message to the maintenance department, takes the tool offline (i.e., out of production) and logs the tool as "down to maintenance" (step 1215).

A maintenance technician receives the "free text" message from the MES 110 and tries to find out the exact nature of the problem, if any, that the tool has experienced. At this point the tool may or may not be exhibiting an original error message that caused the tool operator to create the original "free text" message that described the problem. It may even be that the status of the tool now seems satisfactory and that the "problem" that the tool had is no longer present.

When the tool operator sends a "free text" message to the MES 110 concerning the problem that was detected in the tool, the MES 110 generates a work order (WO) for the problem and sends the work order to the AQUIP system 510 via the IFS system 120 (step 1220). The maintenance technician reviews the work order and determines what steps need to be taken to get the tool running again and ready to go back into production. If the work order indicates that a regularly scheduled maintenance procedure is due, then the maintenance procedure is performed. If the work order indicates the existence of some non-scheduled event that represents a "problem" situation, then the nature of the problem must be determined and corrective steps identified.

The maintenance technician then performs work on the tool (step 1225). The work will be either routine maintenance work or, if a problem exists, corrective work such as repair and replacement of parts. The maintenance technician then enters information into the AQUIP system 510 that explains the nature of the work that the maintenance technician actually performed (step 1230). Unlike the "free text" format used in the prior art method, the maintenance technician enters the information into the AQUIP system 510 by selecting items from a "pick list" (e.g., by checking boxes) on a graphical user interface of the AQUIP system 510. In this manner the maintenance technician makes a thorough description of the work that was performed. This avoids the subjectivity that is often present in the prior art "work done" messages.

The AQUIP system 510 then automatically provides from the component/qualification matrix 810 the appropriate qualification procedures ("Quals") that need to be performed on the tool before the tool can be placed back into production. This step replaces the prior art "Qual Define" process and avoids the delays that are caused by waiting for a process engineer to manually perform the "Qual Define" process. The AQUIP system 510 immediately sends an appropriate message to the tool operator (via MES 110) that identifies the qualification procedures that are to be performed (step 1235).

The tool operator then performs the qualification procedures on the tool that have been identified by the AQUIP system 510 (step 1240). After the tool operator has performed all of the qualification procedures on the tool, then the MES system 110 confirms that all of the qualification procedures have been performed been performed (step 1245). This step avoids the prior art "Qual Verify" process and the prior art "Qual Complete" process. After the MES system 110 has confirmed that all of the required qualification procedures have been performed, the tool is then returned to production (step 1250).

Figure 13:
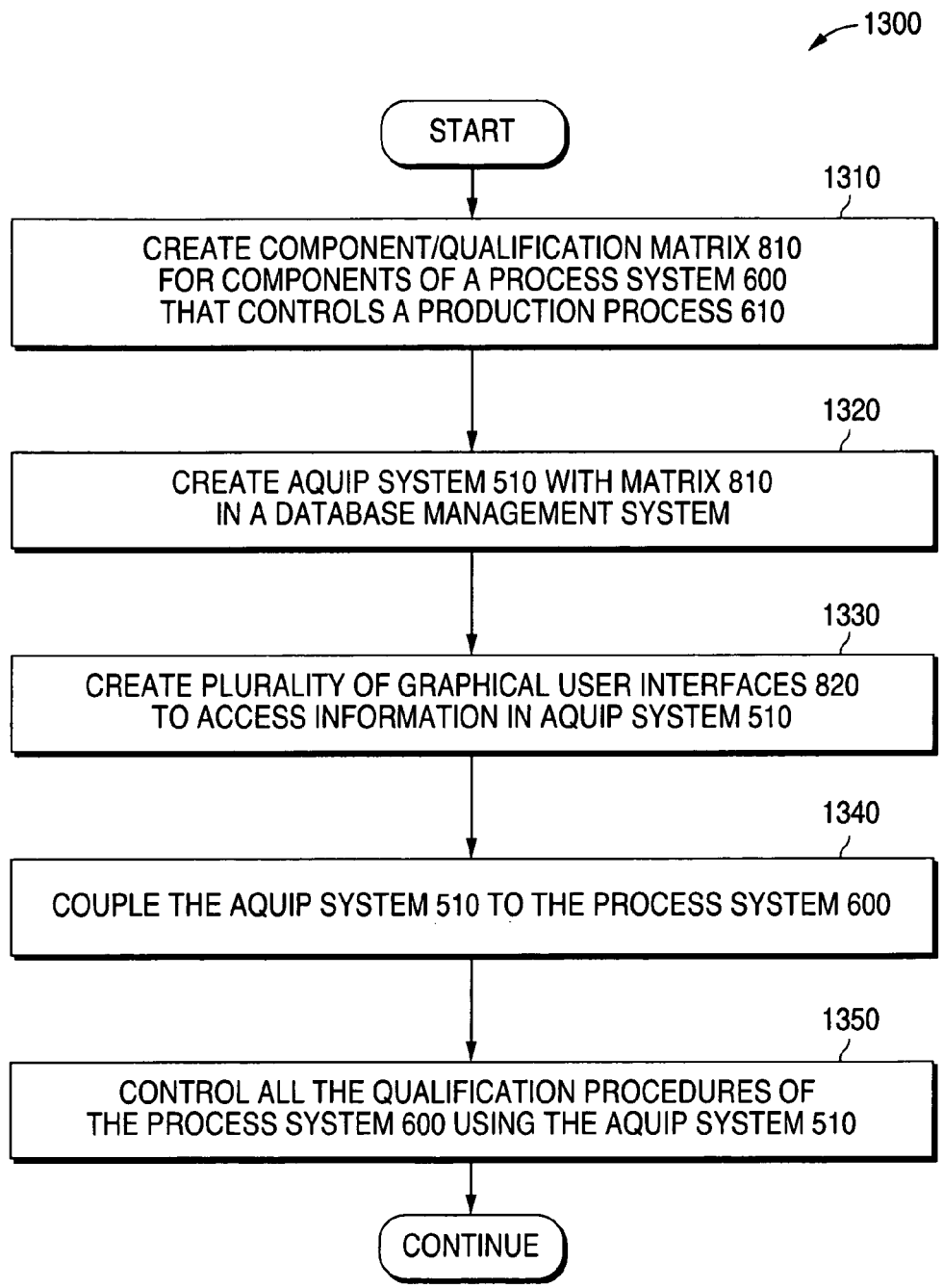
FIG. 13 illustrates a flow chart that shows a sequence of events for creating and operating the automatic qualification intervention process of the present invention.

FIG. 13 illustrates a flow chart 1300 showing a sequence of events for creating and operating the AQUIP system 510 of the present invention. In the first step a component/qualification matrix 810 is created for the components of a process system 600 that controls a production process 610 (step 1310). As previously described, the component/qualification matrix 810 comprises a computerized database containing data in which each component of the process system 600 is associated with at least one qualification procedure that has been determined to be required for properly qualifying the component.

Then the AQUIP system 510 is created by placing the component/qualification matrix 810 in a database management system (step 1320). Then a plurality of graphical user interfaces (GUIs) 820 are created to access various types of information in the AQUIP system 510 (step 1330). The AQUIP system 510 is the coupled to the process system 600 (step 1340). The AQUIP system 510 is then used to control all of the qualification procedures of the process system 600 (step 1350).

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. A method for controlling a qualification intervention process in a manufacturing process that is performed by a plurality of components, the method comprising the steps of:
    receiving a work order from a manufacturing execution system, the work order associated with a tool malfunction;
    selecting one of the components for which it is desired to perform a qualification process in response to the work order, wherein the qualification process comprises at least one operation that must be performed after completion of a maintenance operation to return the selected component to an operational status after the selected component has been removed from operation in the manufacturing process;
    accessing an entry for the selected component in a component/qualification matrix in a database management system;
    identifying from the entry the qualification process to be performed for the selected component;
    providing to the manufacturing execution system the identification of the qualification process to be performed for the selected component; and
    after completion of the maintenance operation associated with the qualification process, confirming that each of the at least one operation associated with the qualification process has been performed.

2. The method as set forth in claim 1, further comprising the step of:
    performing the identified qualification process for the selected component as described in the entry in the component/qualification matrix.

3. The method as set forth in claim 2, wherein performing the identified qualification process comprises the step of:
    determining a course of action to be taken to perform the identified qualification process for the selected component.

4. The method as set forth in claim 2, wherein performing the at least one identified qualification process comprises the step of taking no action.

5. The method as set forth in claim 1, further comprising the steps of:
    associating a plurality of qualification processes with the plurality of components;
    storing the plurality of qualification processes in the component/qualification matrix; and
    at least one of: adding, deleting and altering information stored in the component/qualification matrix.

6. The method as set forth in claim 5, further comprising the step of:
    providing at least one graphical user interface that is configured to access the information stored in the component/qualification matrix.

7. The method of claim 1, further comprising:
    controlling performance of the qualification process in the manufacturing process by requiring the at least one operation associated with the qualification process to be performed in conformity with the qualification process.

8. A method for controlling a qualification intervention process in a manufacturing process that is performed by a plurality of components, the method comprising the steps of:

receiving a work order from a manufacturing execution system, the work order associated with a tool malfunction;

selecting one of the components for which it is desired to perform a qualification process in response to the work order;

accessing an entry for the selected component in a component/qualification matrix in a database management system;

identifying the qualification process to be performed for the selected component from the entry, wherein the qualification process comprises at least one operation that must be performed after completion of a maintenance operation to return the component to an operational status after the component has been removed from operation in the manufacturing process;

providing to the manufacturing execution system the identification of the qualification process to be performed for the component;

controlling performance of the qualification process in the manufacturing process by requiring the at least one operation associated with the qualification process to be performed in conformity with the qualification process; and confirming that each of the at least one operation associated with the qualification process has been performed.

9. The method as set forth in claim 8, further comprising the step of:

associating a plurality of qualification processes with the plurality of components.

10. The method as set forth in claim 8, further comprising the step of:

performing the identified qualification process for the selected component as described in the entry in the component/qualification matrix.

11. The method as set forth in claim 10, wherein performing the identified qualification process comprises the step of:

determining a course of action to be taken to perform the identified qualification process for the selected component.

12. The method as set forth in claim 10, wherein performing the at least one identified qualification process comprises the step of taking no action.

13. The method as set forth in claim 9, further comprising the steps of:

storing the plurality of qualification processes in the component/qualification matrix; and at least one of: adding, deleting and altering information stored in the component/qualification matrix.

14. The method as set forth in claim 13, further comprising the step of:

providing at least one graphical user interface that is configured to access the information stored in the component/qualification matrix.

15. The method of claim 8, wherein the identification of the qualification process is accessible to a tool operator in the manufacturing execution system.

16. An automatic qualification intervention apparatus for controlling a qualification intervention process in a manufacturing process that is performed by a plurality of components, the apparatus comprising:

a computer processing system configured to communicate with a manufacturing execution system;

wherein the computer processing system is further configured to:

receive a work order from the manufacturing execution system, the work order associated with a tool malfunction;

select one of the components for which it is desired to perform a qualification process in response to the work order;

access an entry for the selected component in a component/qualification matrix in a database management system;

identify the qualification process to be performed for the selected component from the entry, wherein the qualification process comprises at least one operation that must be performed after completion of a maintenance operation to return the component to an operational status after the component has been removed from operation in the manufacturing process;

provide to the manufacturing execution system the identification of the qualification process to be performed for the component after completion of the maintenance operation associated with the qualification process; and control performance of the qualification process in the manufacturing process by requiring the at least one operation associated with the qualification process to be performed in conformity with the qualification process.

17. The automatic qualification intervention apparatus as set forth in claim 16, wherein the apparatus further comprises:

a database management system configured to store a component/qualification matrix that identifies a plurality of qualification processes associated with the components; and at least one graphical user interface that is configured to access information stored in the component/qualification matrix.

18. The automatic qualification intervention apparatus as set forth in claim 16, wherein the manufacturing process comprises a semiconductor manufacturing process.

19. The automatic qualification intervention apparatus as set forth in claim 16, wherein the apparatus is configured to determine that the at least' east one operation associated with the qualification process for the component has been performed in conformity with the qualification process.

20. The automatic qualification intervention apparatus as set forth in claim 19, wherein the apparatus is configured to return the component to the operational status after the qualification process has been performed for the component.

* * * * *